(12) United States Patent
Kim et al.

(10) Patent No.: US 8,055,490 B2
(45) Date of Patent: Nov. 8, 2011

(54) SEMI-LAGRANGIAN CIP FLUID SOLVER WITHOUT DIMENSIONAL SPLITTING

(75) Inventors: Doyub Kim, Seoul (KR); Oh-Young Song, Seoul (KR); Hyeong-Seok Ko, Seoul (KR)

(73) Assignee: Seoul National University (KR)

( * ) Notice: Subject to any disclaimer, the term of this patent is extended or adjusted under 35 U.S.C. 154(b) by 345 days.

(21) Appl. No.: 12/414,978

(22) Filed: Mar. 31, 2009

(65) Prior Publication Data

US 2010/0250213 A1     Sep. 30, 2010

(51) Int. Cl.
*G06G 7/50* (2006.01)
(52) U.S. Cl. ............... 703/9; 703/10; 434/118; 434/126
(58) Field of Classification Search ................ 703/9, 10; 434/118, 126
See application file for complete search history.

(56) References Cited

U.S. PATENT DOCUMENTS

| | | | | |
|---|---|---|---|---|
| 7,254,523 | B2 * | 8/2007 | Yu | 703/9 |
| 7,565,276 | B2 * | 7/2009 | Song et al. | 703/2 |
| 2005/0243117 | A1 * | 11/2005 | Yu | 347/19 |
| 2006/0070434 | A1 * | 4/2006 | Yu | 73/152.18 |
| 2007/0043544 | A1 * | 2/2007 | Song et al. | 703/9 |

* cited by examiner

*Primary Examiner* — David Silver
*Assistant Examiner* — Cuong Luu
(74) *Attorney, Agent, or Firm* — John K. Park; Park Law Firm

(57) ABSTRACT

A new constrained interpolation profile method, which is stable and accurate but requires less amount of computation, is provided. CIP is a high-order fluid advection solver that can reproduce rich details of fluids. It has third-order accuracy but its computation is performed over a compact stencil. A novel modification of the original CIP method that fixes all of the above problems without increasing the computational load or reducing the accuracy is provided. The proposed method brings significant improvements in both accuracy and speed.

19 Claims, 3 Drawing Sheets

SEMI-LAGRANGIAN CIP FLUID SOLVER WITHOUT DIMENSIONAL SPLITTING

BACKGROUND OF THE INVENTION

The present invention relates to a semi-Lagrangian CIP fluid solver without dimensional splitting.

More particularly, this invention relates to method for simulating fluid using semi-Lagrangian CIP fluid solver without dimensional splitting.

1. INTRODUCTION

The visual quality of a fluid simulation heavily depends on the accuracy of the advection solver. Since the graphics community became aware of this problem, developing an accurate advection solver has been a primary concern. Attempts have been made to develop high-order advection solvers in the Eulerian framework. These efforts have yielded methods such as the monotonic cubic spline method [FSJ01], the constrained interpolation profile (CIP) method [TFK*03, SSK05], and the back and forth error compensation and correction (BFECC) method [KLLR05, KLLR07]. Hybrid methods, which combine the Lagrangian and Eulerian frameworks, have also been explored. Examples of these techniques are the particle level set method [EMF02], the vortex particle method [SRF05], and derivative particles [SKK07]. What the present invention provides is the first kind; It develops a fast, stable, but accurate advection solver in the Eulerian framework. To achieve improved performance, we modified the CIP scheme. Although the proposed method is a purely Eulerian advection solver, it can freely combine with the Lagrangian framework. In fact, it can be used to bring improvements to the above hybrid methods.

Efforts to develop high-order (Eulerian) advection schemes have been led by the computational fluid dynamics (CFD) community. Essentially non-oscillatory (ENO) and weighted ENO (WENO) [OF02] methods are widely used high-order methods in CFD. Another advection scheme based on monotonic cubic-spline polynomials has also been proposed in the graphics field [FSJ01]. In both the ENO/WENO and cubic-spline polynomial approaches, however, the computations are performed over wide stencils, which become problematic when the simulation domain contains complex inner boundaries. Moreover, it is nontrivial to employ adaptive grids when wide stencils are used.

Meanwhile, Yabe and Aoki [YA91, YIW*91] invented a third-order advection scheme, the CIP method, which works with a compact stencil. Unfortunately, this method suffered from instabilities, prompting the development of a modified method known as rational CIP (RCIP) [XYNI96a, XYNI96b]; however, although RCIP is more stable than CIP, it is still not unconditionally stable. Song et al. [SSK05] proposed an unconditionally stable variation of CIP, the monotonic CIP method (MCIP). For the semi-Lagrangian backtracking, they used a dimensional splitting approach based on a tri-cubic interpolation composed of a number of 1D MCIP interpolations. Although MCIP is unconditionally stable, the dimensional splitting significantly increases the computational load, and causes additional numerical dissipation compared to unsplit CIPs.

The present invention provides a stable CIP method that does not employ dimensional splitting. The new method, which is based on the semi-Lagrangian method, is unconditionally stable. It runs faster than MCIP and BFECC, but produces results that are clearly less diffusive (See also FIGS. 1 and 2 of Eurographics Volume 27 (2008), Number 2, which is referred as "the paper" below.)

Accordingly, a need for a method for simulating fluid realistically has been present for a long time in the community. This invention is directed to solve these problems and satisfy the long-felt need.

SUMMARY OF THE INVENTION

The present invention contrives to solve the disadvantages of the prior art.

An objective of the invention is to provide a semi-Lagrangian CIP fluid solver without dimensional splitting.

Another objective of the invention is to provide method for simulating fluid using semi-Lagrangian CIP fluid solver without dimensional splitting.

Still another objective of the invention is to provide method for simulating fluid fast and realistically using semi-Lagrangian CIP fluid solver without dimensional splitting.

U.S. patent application Ser. No. 11/318,171, which was filed on Dec. 23, 2005, for an invention entitled "Method for Simulating Stable but Non-Dissipative Water", and the paper, Eurographics Volume 27 (2008), Number 2 are by the inventors including two Applicants of the present application. The disclosures of the application and the paper are incorporated by reference as if fully set forth herein.

An aspect of the invention provides a method for simulating fluid using semi-Lagrangian CIP fluid solver without dimensional splitting.

The method comprises steps for: modeling multiphase materials with grid of nodes for dealing with the multiphase behaviors including the dynamics of the borders between liquids and gas; suppressing numerical dissipation for getting rid of loss of mass of material of one phase from numerical dissipations due to the coarseness of the modeling of the materials in terms of grid of nodes; and suppressing numerical diffusion for reducing dampening of the fluid motion of materials in liquid phase.

The step of modeling multiphase materials comprises steps of: describing liquid and gas with a set of nonlinear partial differential equations that describe the flow of the fluids; representing the liquid-gas interface as an implicit surface; an determining properties of the materials, from the information about the liquid-gas interface, including the surface curvature and the surface tension.

The set of nonlinear partial differential equations comprises multiphase incompressible Navier-Stokes equations, wherein the step of representing the liquid-gas interface comprises a level set equation, $\phi$.

The flow of fluid is described by the incompressible Navier-Stokes equations: $\nabla \cdot u = 0$; and $$\frac{\partial u}{\partial t} = -u \cdot \nabla u + \frac{f}{\rho} + \frac{v}{\rho}\nabla^2 u - \frac{\nabla p}{\rho},$$

wherein u denotes the velocity field of the fluid, p pressure, $\rho$ the density, v the kinetic viscosity, and f represents the external forces per volume.

The liquid evolves dynamically in space and time according to the underlying fluid velocity field, u, wherein the level set function changes according to the dynamical evolution of liquid and is updated by the level set equation, $$\frac{\partial \phi}{\partial t} + u \cdot \nabla \phi = 0.$$

The method further comprises the step of solving the incompressible Navier-Stokes equations and the level set equation at each time step.

The step of solving the incompressible Navier-Stokes equations and the level set equation comprises steps of: advecting the level set according to the level set equation; updating the velocity by solving the Navier-Stokes equations; and simulating droplets and bubbles, The level set function $\phi$ and the fluid velocity field u are updated.

The step of updating the velocity comprises steps of: calculating the advection component $u \cdot \nabla u$ using the semi-Lagrangian method; applying the forces $f/\rho$; adding the effect of the viscous term $v/\rho \nabla^2 u$ by employing implicit central differencing; and projecting the velocity field so that the condition $\nabla \cdot u = 0$ is met.

The step of calculating the advection component comprises steps of: applying an unsplit semi-Lagrangian constrained interpolation profile (USCIP) method of using the function values at the grid points and the spatial derivatives at those points for constructing the profile inside the grid cell; and solving the level set equation to advect the level set values.

With the CIP method, the profile corresponding to the interval $[x_i, x_{i+1}]$ in a two-dimensional case is represented by a polynomial, $$\Phi(x, y) = \sum_{0 \le i+j \le 3} C_{ij} x^i y^j + C_{31} x^3 y + C_{13} xy^3. \quad (7)$$

where C00, ..., C31 are coefficients of the polynomial.

The coefficients are uniquely given by, $$\begin{aligned}
C_{00} &= \phi_{00} \\
C_{10} &= \phi_{x00} \\
C_{01} &= \phi_{y00} \\
C_{20} &= 3(\phi_{10} - \phi_{00}) - \phi_{x10} - 2\phi_{x00} \\
C_{02} &= 3(\phi_{01} - \phi_{00}) - \phi_{y01} - 2\phi_{y00} \\
C_{30} &= -2(\phi_{10} - \phi_{00}) + \phi_{x10} + \phi_{x00} \\
C_{03} &= -2(\phi_{01} - \phi_{00}) + \phi_{y01} + \phi_{y00} \\
C_{21} &= 3\phi_{11} - 2\phi_{x01} - \phi_{x11} - 3(C_{00} + C_{01} + C_{02} + C_{03}) - C_{20} \\
C_{31} &= -2\phi_{11} + \phi_{x01} - \phi_{x11} - 2(C_{00} + C_{01} + C_{02} + C_{03}) - C_{30} \\
C_{12} &= 3\phi_{11} - 2\phi_{y10} - \phi_{y11} - 3(C_{30} + C_{20} + C_{10} + C_{00}) - C_{02} \\
C_{13} &= -2\phi_{11} + \phi_{y10} - \phi_{y11} - 2(C_{00} + C_{10} + C_{20} + C_{30}) - C_{03} \\
C_{11} &= \phi_{x01} - C_{13} - C_{12} - C_{10}.
\end{aligned} \quad (8)$$

The $\Phi_{00}, \Phi_{10}, \Phi_{01}$, and $\Phi_{11}$ are physical quantities at each cell corner, $\Phi_x = \partial \Phi/\partial x$, $\Phi_y = \partial \Phi/\partial y$, and $\Phi_{x00}, \Phi_{x10}, \Phi_{x01}, \Phi_{x11}, \Phi_{y00}, \Phi_{y10}, \Phi_{y01}$, and $\Phi_{y11}$ are the derivative values at each cell corner.

The step of representing the liquid-gas interface may comprise a level set method.

The level set method may comprise a level set equation, $\phi$, an implicit signed distance function defined to be positive for liquid and negative for gas, wherein the sign of $\phi$ determines the density and viscosity of the medium.

The surface of liquid may be obtained by tracking the locations for $\phi = 0$.

The step of advecting the level set may comprise a step of updating the density and viscosity fields appearing in the Navier-Stokes equation.

The semi-Lagrangian method may comprise a step of calculating a function value by referring to the advection at $x - u\Delta t$, wherein the function value is obtained by linearly interpolating the function values at the neighboring grid points.

The step of solving the level set equation may comprise steps of: differentiating the level set equation to get $$\frac{\partial \phi_\xi}{\partial t} + u \cdot \nabla \phi_\xi = -u_\xi \cdot \nabla \phi,$$

wherein $\phi_\xi = \partial \phi/\partial \xi$, $u_\xi = \partial u/\partial \xi$, and $\xi$ is one of the spatial variables x, y, and z; solving the non-advective part $\partial \phi_\xi/\partial t = -u_\xi \cdot \nabla \phi$ using finite differencing; and advecting the result according to $$\frac{\partial \phi_\xi}{\partial t} + u \cdot \nabla \phi_\xi = 0,$$

wherein the advected results $\phi_j$ and $\phi'_j$ for a grid point $x_j$ backtraced to $x_r \in [x_i, x_{i+1}]$ are obtained as $\phi_j = \Phi(X_r)$ and $\phi'_j = \Phi'(X_r)$, wherein $X_r = x_r - x_i$.

The step of calculating the profile $\Phi$ may comprise a step of applying a monotonic CIP method to the grid points in which oscillations are present, that is the value $\Phi((X_r)$ lies outside the range $[\phi_i, \phi_{i+1}]$.

The monotonic CIP method may comprise a step of modifying the derivatives $\phi'_i$ and $\phi'_{i-1}$ by using a polynomial function giving a monotonic profile instead of a rational function.

The CIP method may comprise a step of approximating the second order and higher derivatives by finite differencing of the first order derivatives in a three-dimensional calculation.

The force comprises gravity and surface tension, wherein the gravity is $\rho g$, where g is the gravitational acceleration, wherein the surface tension is given by $f_{st} = -\rho \sigma \kappa(\phi) \delta_\epsilon(\phi) \nabla \phi$, where $\sigma$ is a constant coefficient, $\kappa$ is the local curvature, and $\delta_\epsilon$ is a smeared delta function, $$\begin{aligned}
\delta_\epsilon(\phi) &= \frac{1}{2\epsilon} + \frac{1}{2\epsilon} \cos\left(\frac{\pi \phi}{\epsilon}\right); \quad |\phi| \le \epsilon, \\
&= 0; \quad \text{otherwise,}
\end{aligned}$$

where $\epsilon$ is a smearing width.

The step of simulating droplets and bubbles comprises steps of: locating the droplets or bubbles; simulating the region with Lagrangian motion based on particle dynamics; reducing the level set values of the region to values that are small for the droplets and negating the original level set values for the bubbles such that the region will not be mistakenly processed by the level set method; and restituting the droplets or bubbles into the grid-based fluid model.

The droplets or bubbles in the step of simulating the region with Lagrangian motion may experience gravitational, drag forces, and pressure from the surrounding fluid, $$f = m_f g + \alpha_d r^2 (\bar{u} - \dot{x}) \| \bar{u} - \dot{x} \| - V_f \nabla p,$$

where $m_f$ is the mass, $V_f$ is the volume, $\alpha_d$ is the drag coefficient, r is the radius, $\dot{x}$ is the current velocity of the droplet or bubble, and $\bar{u}$ is the interpolated velocity of the grid-based fluid measured at the center of the droplet or bubble.

The step of restituting the droplets or bubbles may comprise steps of: locating the droplets or bubbles in which the volume of the droplet or bubble is larger than at least two times the cell size; and removing the droplet or bubble, updating the level set values by $\phi(x_i) = s_p(r_p - |x_i - x_p|)$, and setting the grid point velocities to the velocity of the droplet or bubble, wherein $s_p = +1$ for the case of liquid droplet and $-1$ for the case of gas bubble, $r_p$ is the radius of the droplet or bubble, $x_p$ is the center of the droplet or bubble, and $x_i$ is the grid point being updated.

The step of restituting the droplets or bubbles may comprise steps of: locating the droplet or bubble which hits the surface or moves into the same phase fluid; updating the cell velocity by taking the average of the previous cell velocity and the velocity of droplet or bubble; and determining the new level set values for the cells covering the droplet or bubble using the volume of the droplets or bubbles.

The method may further comprises steps of: generating multiple droplets or bubbles of smaller size to produce splashes and bubbles of smaller scales; modeling the geometrical shape of the droplet or bubble as an ellipsoid, wherein the eccentricity of the ellipsoid depends on the velocity of the droplet or bubble; and assigning to the surfacing bubbles a life time that is inversely proportional to the bubble size.

Another aspect of the invention provides method for simulating fluid using semi-Lagrangian CIP fluid solver without dimensional splitting, the method comprising steps for: modeling multiphase materials with grid of nodes for dealing with the multiphase behaviors including the dynamics of the borders between liquids and gas; suppressing numerical dissipation for getting rid of loss of mass of material of one phase from numerical dissipations due to the coarseness of the modeling of the materials in terms of grid of nodes; and suppressing numerical diffusion for reducing dampening of the fluid motion of materials in liquid phase.

The step of modeling multiphase materials comprises steps of: describing liquid and gas with a set of nonlinear partial differential equations that describe the flow of the fluids; representing the liquid-gas interface as an implicit surface; and determining properties of the materials, from the information about the liquid-gas interface, including the surface curvature and the surface tension.

The set of nonlinear partial differential equations comprises multiphase incompressible Navier-Stokes equations, and the step of representing the liquid-gas interface comprises a level set equation, $\phi$.

The flow of fluid is described by the incompressible Navier-Stokes equations: $\nabla \cdot u = 0$; and $$\frac{\partial u}{\partial t} = -u \cdot \nabla u + \frac{f}{\rho} + \frac{\nu}{\rho} \nabla^2 u - \frac{\nabla p}{\rho},$$

where u denotes the velocity field of the fluid, p pressure, $\rho$ the density, $\nu$ the kinetic viscosity, and f represents the external forces per volume.

The liquid evolves dynamically in space and time according to the underlying fluid velocity field, u, wherein the level set function changes according to the dynamical evolution of liquid and is updated by the level set equation, $$\frac{\partial \phi}{\partial t} + u \cdot \nabla \phi = 0.$$

The method further comprises the step of solving the incompressible Navier-Stokes equations and the level set equation at each time step.

The step of solving the incompressible Navier-Stokes equations and the level set equation comprises steps of: advecting the level set according to the level set equation; updating the velocity by solving the Navier-Stokes equations; and simulating droplets and bubbles.

The level set function $\phi$ and the fluid velocity field u are updated.

The step of updating the velocity comprises steps of: calculating the advection component $u \cdot \nabla u$ using the semi-Lagrangian method; applying the forces $f/\rho$; adding the effect of the viscous term $\nu/\rho \nabla^2 u$ by employing implicit central differencing; and projecting the velocity field so that the condition $\nabla \cdot u = 0$ is met.

The step of calculating the advection component comprises steps of: applying an unsplit semi-Lagrangian constrained interpolation profile (USCIP) method of using the function values at the grid points and the spatial derivatives at those points for constructing the profile inside the grid cell; and solving the level set equation to advect the level set values, and With the CIP method, the profile corresponding to the interval $[x_i, x_{i-1}]$ in a three-dimensional case is represented by a polynomial, $$\Phi(x, y, z) = \sum_{0 \leq i+j+k \leq 3} C_{ijk} x^i y^j z^k + C_{310} x^3 y + C_{301} x z^3 +$$
$$C_{130} x y^3 + C_{031} y^3 z + C_{103} z^3 x + C_{013} z^3 y + C_{211} x^2 y x +$$
$$C_{121} x y^2 z + C_{112} x y z^2 + C_{311} x^3 y x + C_{131} x y^3 z + C_{113} x y z^3.$$

The coefficients may be uniquely given by, $$C_{000} = \phi_{000}, C_{100} = \phi_{x000}, C_{010} = \phi_{y000}, C_{001} = \phi_{z000}$$

$$C_{110} = \phi_{x010} - \phi_{x000} - (\Delta y_{10} - \Delta y_{00}) + (\phi_{y100} - \phi_{y000})$$

$$C_{011} = \phi_{y001} - \phi_{y000} - (\Delta z_{01} - \Delta z_{00}) + (\phi_{z010} - \phi_{z000})$$

$$C_{101} = \phi_{z100} - \phi_{z000} - (\Delta x_{01} - \Delta x_{00}) + (\phi_{x001} - \phi_{x000})$$

$$C_{200} = 3\Delta x_{00} - \phi_{x100} - 2\phi_{x000}$$

$$C_{020} = 3\Delta y_{00} - \phi_{y010} - 2\phi_{y000}$$

$$C_{002} = 3\Delta z_{00} - \phi_{z001} - 2\phi_{z000}$$

$$C_{111} = (\phi_{x011} - \phi_{x010} - \phi_{x001} + \phi_{x000}) + (\phi_{y101} - \phi_{y100} - \phi_{y001} + \phi_{y000}) +$$
$$(\phi_{z110} - \phi_{z100} - \phi_{z010} + \phi_{z000}) - 2(\phi_{111} - A)$$

$$C_{210} = 3(\Delta x_{10} - \Delta x_{00}) - 2(\phi_{x010} - \phi_{x000} - \phi_{x110} + \phi_{x100})$$

$$C_{201} = 3(\Delta x_{01} - \Delta x_{00}) - 2(\phi_{x001} - \phi_{x000} - \phi_{x101} + \phi_{x100})$$

$$C_{120} = 3(\Delta y_{10} - \Delta y_{00}) - 2(\phi_{y100} - \phi_{y000} - \phi_{y110} + \phi_{y010})$$

-continued $$C_{021} = 3(\Delta y_{01} - \Delta y_{00}) - 2(\phi_{y001} - \phi_{y000} - \phi_{y011} + \phi_{y010})$$

$$C_{102} = 3(\Delta z_{10} - \Delta z_{00}) - 2(\phi_{z100} - \phi_{z000} - \phi_{z101} + \phi_{z001})$$

$$C_{012} = 3(\Delta z_{01} - \Delta z_{00}) - 2(\phi_{z010} - \phi_{z000} - \phi_{z011} + \phi_{z001})$$

$$C_{300} = \phi_{x100} + \phi_{x000} - 2\Delta x_{00}$$

$$C_{030} = \phi_{y010} + \phi_{y000} - 2\Delta y_{00}$$

$$C_{003} = \phi_{z001} + \phi_{z000} - 2\Delta z_{00}$$

$$C_{310} = \phi_{x110} - \phi_{x100} + \phi_{x010} - \phi_{x000} - 2(\Delta x_{10} - \Delta x_{00})$$

$$C_{301} = \phi_{x101} - \phi_{x100} + \phi_{x001} - \phi_{x000} - 2(\Delta x_{01} - \Delta x_{00})$$

$$C_{130} = \phi_{y110} - \phi_{y010} + \phi_{y100} - \phi_{y000} - 2(\Delta y_{10} - \Delta y_{00})$$

$$C_{031} = \phi_{y011} - \phi_{y010} + \phi_{y001} - \phi_{y000} - 2(\Delta y_{01} - \Delta y_{00})$$

$$C_{103} = \phi_{z101} - \phi_{z000} + \phi_{z100} - \phi_{z000} - 2(\Delta z_{10} - \Delta z_{00})$$

$$C_{013} = \phi_{z011} - \phi_{z000} + \phi_{z010} - \phi_{z000} - 2(\Delta z_{01} - \Delta z_{00})$$

$$C_{211} = 3(\phi_{111} - A) - (\phi_{x111} - \phi_{x110} - \phi_{x101} + \phi_{x100}) - 2(\phi_{x011} - \phi_{x010} - \phi_{x001} + \phi_{x000})$$

$$C_{121} = 3(\phi_{111} - A) - (\phi_{y111} - \phi_{y110} - \phi_{y011} + \phi_{y010}) - 2(\phi_{y101} - \phi_{y100} - \phi_{y001} + \phi_{y000})$$

$$C_{112} = 3(\phi_{111} - A) - (\phi_{z111} - \phi_{z101} - \phi_{z011} + \phi_{z001}) - 2(\phi_{z110} - \phi_{z100} - \phi_{z010} + \phi_{z000})$$

$$C_{311} = (\phi_{x111} - \phi_{x110} - \phi_{x101} + \phi_{x100}) + (\phi_{x011} - \phi_{x010} - \phi_{x001} + \phi_{x000}) - 2(\phi_{111} - A)$$

$$C_{131} = (\phi_{y111} - \phi_{y110} - \phi_{y011} + \phi_{y010}) + (\phi_{y101} - \phi_{y100} - \phi_{y001} + \phi_{y000}) - 2(\phi_{111} - A)$$

$$C_{113} = (\phi_{z111} - \phi_{z101} - \phi_{z011} + \phi_{z001}) + (\phi_{z110} - \phi_{z100} - \phi_{z010} + \phi_{z000}) - 2(\phi_{111} - A)$$

$$A = \phi_{100} + \phi_{y100} + \phi_{z100} + C_{011} + C_{020} + C_{002} + C_{120} + C_{021} + C_{102} + C_{012} + C_{030} + C_{003} + C_{130} + C_{031} + C_{103} + C_{013}.$$

where $\Delta xjk = \phi x1jk - \phi x0jk$, $\Delta yik = \phi yi1k - \phi i0k$, and $\Delta zij = \phi zij1 - \phi zij0$.

The advantages of the present invention are: (1) the method for simulating fluid using semi-Lagrangian CIP fluid solver without dimensional splitting is stable; (2) the method provides realistic results; and (3) the method can be extended to two-dimensional and three-dimensional cases.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF THE INVENTION

An aspect of the invention provides a method for simulating fluid using semi-Lagrangian CIP fluid solver without dimensional splitting.

Figure 1:
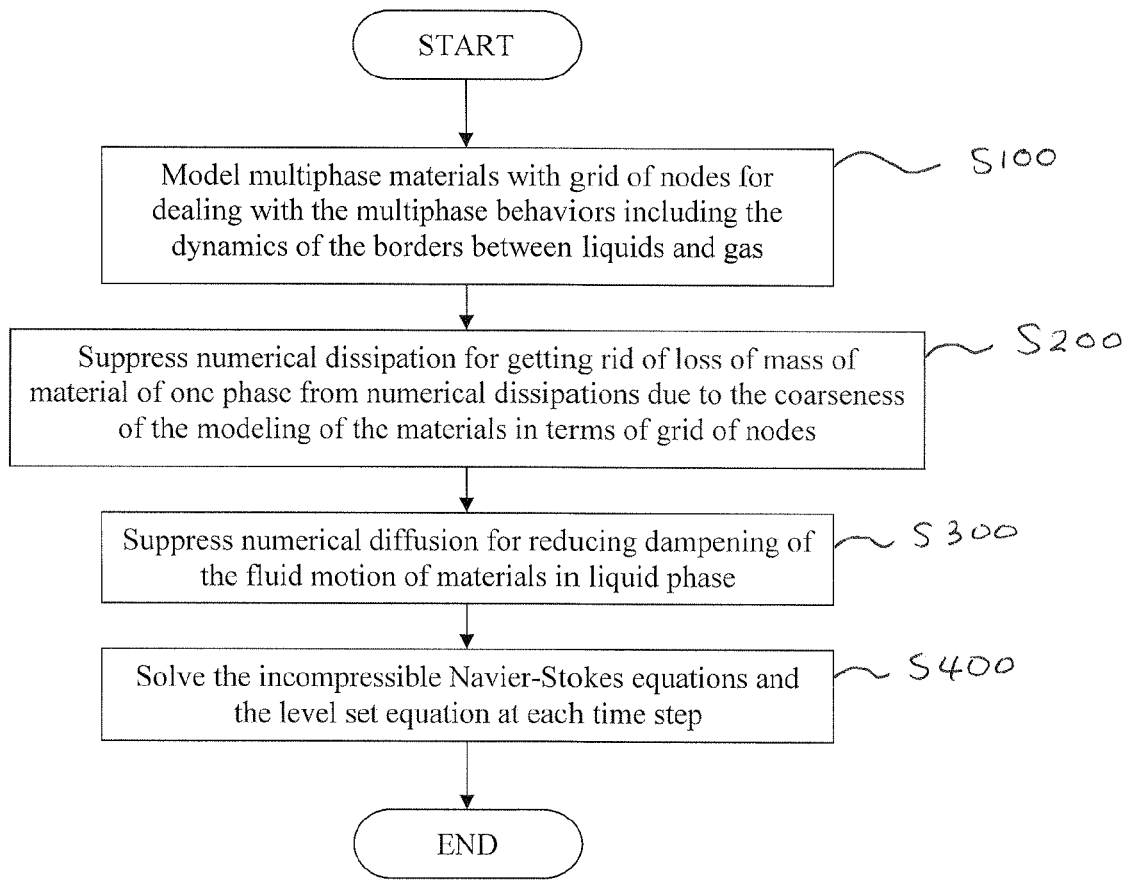
FIG. 1 is a flowchart illustrating a method for simulating fluid using semi-Lagrangian CIP fluid solver without dimensional splitting according to an embodiment of the invention.
Figure 2:
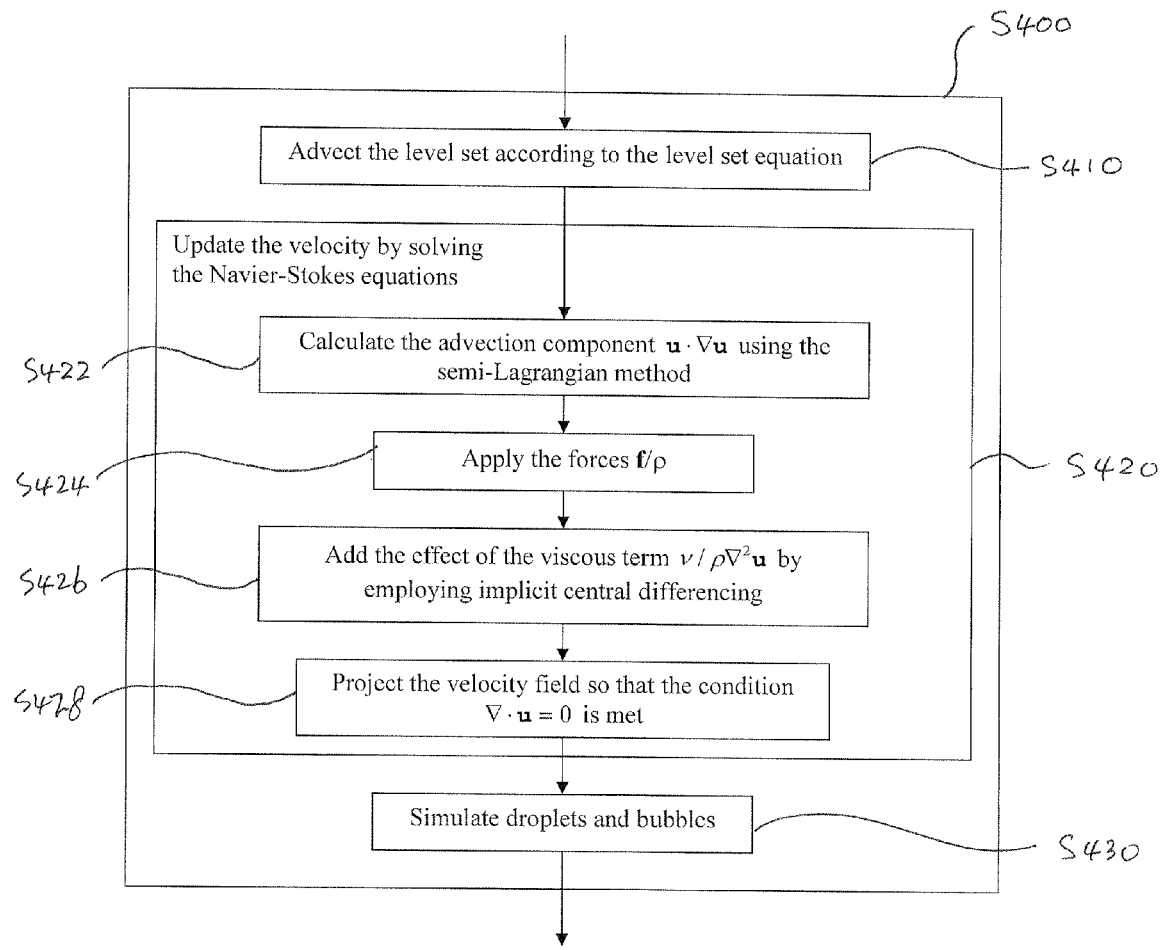
FIG. 2 is a flowchart illustrating a step of solving an incompressible Navier-Stokes equations and a level set equation at each time step according to an embodiment of the invention.

FIGS. 1 and 2 show flowcharts for the method.

The method comprises steps for: modeling multiphase materials with grid of nodes for dealing with the multiphase behaviors including the dynamics of the borders between liquids and gas (S100); suppressing numerical dissipation for getting rid of loss of mass of material of one phase from numerical dissipations due to the coarseness of the modeling of the materials in terms of grid of nodes (S200); and suppressing numerical diffusion for reducing dampening of the fluid motion of materials in liquid phase (S300).

The step of modeling multiphase materials (S100) comprises steps of: describing liquid and gas with a set of nonlinear partial differential equations that describe the flow of the fluids; representing the liquid-gas interface as an implicit surface; an determining properties of the materials, from the information about the liquid-gas interface, including the surface curvature and the surface tension.

The set of nonlinear partial differential equations comprises multiphase incompressible Navier-Stokes equations, wherein the step of representing the liquid-gas interface comprises a level set equation, $\phi$.

The flow of fluid is described by the incompressible Navier-Stokes equations: $\nabla \cdot u = 0$; and $$\frac{\partial u}{\partial t} = -u \cdot \nabla u + \frac{f}{\rho} + \frac{v}{\rho}\nabla^2 u - \frac{\nabla p}{\rho},$$

wherein u denotes the velocity field of the fluid, p pressure, $\rho$ the density, $v$ the kinetic viscosity, and f represents the external forces per volume.

The liquid evolves dynamically in space and time according to the underlying fluid velocity field, u, wherein the level set function changes according to the dynamical evolution of liquid and is updated by the level set equation, $$\frac{\partial \phi}{\partial t} + u \cdot \nabla \phi = 0.$$

The method further comprises the step of solving the incompressible Navier-Stokes equations and the level set equation at each time step (S400).

The step of solving the incompressible Navier-Stokes equations and the level set equation (S400) comprises steps of: advecting the level set according to the level set equation (S410); updating the velocity by solving the Navier-Stokes equations (S420); and simulating droplets and bubbles (S430).

The level set function $\phi$ and the fluid velocity field u are updated.

The step of updating the velocity (S420) comprises steps of: calculating the advection component $u \cdot \nabla u$ using the semi-Lagrangian method (S422); applying the forces $f/\rho$ (S424); adding the effect of the viscous term $v/\rho \nabla^2 u$ by employing implicit central differencing (S426); and projecting the velocity field so that the condition $\nabla \cdot u = 0$ is met (S428).

The step of calculating the advection component (S422) comprises steps of: applying an unsplit semi-Lagrangian constrained interpolation profile (USCIP) method of using the function values at the grid points and the spatial derivatives at those points for constructing the profile inside the grid cell; and solving the level set equation to advect the level set values.

With the CIP method, the profile corresponding to the interval $[x_i, x_{i+1}]$ in a two-dimensional case is represented by a polynomial, $$\Phi(x,y) = \sum_{0 \le i+j \le 3} C_{ij} x^i y^j + C_{31} x^3 y + C_{13} x y^3. \quad (7),$$

where C00, ..., C31 are coefficients of the polynomial.

The coefficients are uniquely given by, $$C_{00} = \phi_{00} \quad (8)$$
$$C_{10} = \phi_{x00}$$
$$C_{01} = \phi_{y00}$$
$$C_{20} = 3(\phi_{10} - \phi_{00}) - \phi_{x10} - 2\phi_{x00}$$
$$C_{02} = 3(\phi_{01} - \phi_{00}) - \phi_{y01} - 2\phi_{y00}$$
$$C_{30} = -2(\phi_{10} - \phi_{00}) + \phi_{x10} + \phi_{x00}$$
$$C_{03} = -2(\phi_{01} - \phi_{00}) + \phi_{y01} + \phi_{y00}$$
$$C_{21} = 3\phi_{11} - 2\phi_{x01} - \phi_{x11} - 3(C_{00} + C_{01} + C_{02} + C_{03}) - C_{20}$$
$$C_{31} = -2\phi_{11} + \phi_{x01} - \phi_{x11} - 2(C_{00} + C_{01} + C_{02} + C_{03}) - C_{30}$$
$$C_{12} = 3\phi_{11} - 2\phi_{y10} - \phi_{y11} - 3(C_{30} + C_{20} + C_{10} + C_{00}) - C_{02}$$
$$C_{13} = -2\phi_{11} + \phi_{y10} - \phi_{y11} - 2(C_{00} + C_{10} + C_{20} + C_{30}) - C_{03}$$
$$C_{11} = \phi_{x01} - C_{13} - C_{12} - C_{10}.$$

The $\Phi_{00}, \Phi_{10}, \Phi_{01}$, and $\Phi_{11}$, are physical quantities at each cell corner, $\Phi_x = \partial \Phi / \partial x$, $\Phi_y = \partial \Phi / \partial y$, and $\Phi_{x00}, \Phi_{x10}, \Phi_{x01}, \Phi_{x11}, \Phi_{y00}, \Phi_{y10}, \Phi_{y01}$ and $\Phi_{y11}$ are the derivative values at each cell corner.

The step of representing the liquid-gas interface may comprise a level set method.

The level set method may comprise a level set equation, $\phi$, an implicit signed distance function defined to be positive for liquid and negative for gas, wherein the sign of $\phi$ determines the density and viscosity of the medium.

The surface of liquid may be obtained by tracking the locations for $\phi=0$.

The step of advecting the level set may comprise a step of updating the density and viscosity fields appearing in the Navier-Stokes equation.

The semi-Lagrangian method may comprise a step of calculating a function value by referring to the advection at $x-u\Delta t$, wherein the function value is obtained by linearly interpolating the function values at the neighboring grid points.

The step of solving the level set equation may comprise steps of: differentiating the level set equation to get $$\frac{\partial \phi_\xi}{\partial t} + u \cdot \nabla \phi_\xi = -u_\xi \cdot \nabla \phi,$$

wherein $\phi_\xi = \partial \phi / \partial \xi$, $u_\xi = \partial u / \partial \xi$, and $\xi$ is one of the spatial variables x, y, and z; solving the non-advective part $\partial \phi_\xi / \partial t = -u_\xi \cdot \nabla \phi$ using finite differencing; and advecting the result according to $$\frac{\partial \phi_\xi}{\partial t} + u \cdot \nabla \phi_\xi = 0,$$

wherein the advected results $\phi_j$ and $\phi'_j$ for a grid point $x_j$ backtraced to $x_r \in [x_i, x_{i+1}]$ are obtained as $\phi_j = \Phi(X_r)$ and $\phi'_j = \Phi'(X_r)$, wherein $X_r = x_r - x_i$.

The step of calculating the profile $\Phi$ may comprise a step of applying a monotonic CIP method to the grid points in which oscillations are present, that is the value $\Phi(X_r)$ lies outside the range $[\phi_i, \phi_{i+1}]$.

The monotonic CIP method may comprise a step of modifying the derivatives $\phi'_i$ and $\phi'_{i-1}$ by using a polynomial function giving a monotonic profile instead of a rational function.

The CIP method may comprise a step of approximating the second order and higher derivatives by finite differencing of the first order derivatives in a three-dimensional calculation.

The force comprises gravity and surface tension, wherein the gravity is $\rho g$, where g is the gravitational acceleration, wherein the surface tension is given by $f_{st} = -\rho \sigma \kappa(\phi) \delta_\epsilon(\phi) \nabla \phi$, where $\sigma$ is a constant coefficient, $\kappa$ is the local curvature, and $\delta_\epsilon$ is a smeared delta function, $$\delta_\epsilon(\phi) = \frac{1}{2\epsilon} + \frac{1}{2\epsilon} \cos\left(\frac{\pi \phi}{\epsilon}\right); \quad |\phi| \le \epsilon,$$
$$= 0; \quad \text{otherwise,}$$

where $\epsilon$ is a smearing width.

The step of simulating droplets and bubbles comprises steps of: locating the droplets or bubbles; simulating the region with Lagrangian motion based on particle dynamics; reducing the level set values of the region to values that are small for the droplets and negating the original level set values for the bubbles such that the region will not be mistakenly processed by the level set method; and restituting the droplets or bubbles into the grid-based fluid model.

The droplets or bubbles in the step of simulating the region with Lagrangian motion may experience gravitational, drag forces, and pressure from the surrounding fluid, $$f = m_f g + \alpha_d r^2 (\overline{u} - \dot{x}) |\overline{u} - \dot{x}| - V_f \nabla p,$$

where $m_f$ is the mass, $V_f$ is the volume, $\alpha_d$ is the drag coefficient, r is the radius, $\dot{x}$ is the current velocity of the droplet or bubble, and $\overline{u}$ is the interpolated velocity of the grid-based fluid measured at the center of the droplet or bubble.

The step of restituting the droplets or bubbles may comprise steps of: locating the droplets or bubbles in which the volume of the droplet or bubble is larger than at least two times the cell size; and removing the droplet or bubble, updating the level set values by $\phi(x_i) = s_p(r_p - |x_{i-xp}|)$, and setting the grid point velocities to the velocity of the droplet or bubble, wherein $s_p = +1$ for the case of liquid droplet and $-1$ for the case of gas bubble, $r_p$ is the radius of the droplet or bubble, $x_p$ is the center of the droplet or bubble, and $x_i$ is the grid point being updated.

The step of restituting the droplets or bubbles may comprise steps of: locating the droplet or bubble which hits the surface or moves into the same phase fluid; updating the cell velocity by taking the average of the previous cell velocity and the velocity of droplet or bubble; and determining the new level set values for the cells covering the droplet or bubble using the volume of the droplets or bubbles.

The method may further comprises steps of: generating multiple droplets or bubbles of smaller size to produce splashes and bubbles of smaller scales; modeling the geometrical shape of the droplet or bubble as an ellipsoid, wherein the eccentricity of the ellipsoid depends on the velocity of the droplet or bubble; and assigning to the surfacing bubbles a life time that is inversely proportional to the bubble size.

Another aspect of the invention provides method for simulating fluid using semi-Lagrangian CIP fluid solver without dimensional splitting, the method comprising steps for: modeling multiphase materials with grid of nodes for dealing with the multiphase behaviors including the dynamics of the borders between liquids and gas; suppressing numerical dissipation for getting rid of loss of mass of material of one phase from numerical dissipations due to the coarseness of the modeling of the materials in terms of grid of nodes; and suppressing numerical diffusion for reducing dampening of the fluid motion of materials in liquid phase.

The step of modeling multiphase materials comprises steps of: describing liquid and gas with a set of nonlinear partial differential equations that describe the flow of the fluids; representing the liquid-gas interface as an implicit surface; and determining properties of the materials, from the information about the liquid-gas interface, including the surface curvature and the surface tension.

The set of nonlinear partial differential equations comprises multiphase incompressible Navier-Stokes equations, and the step of representing the liquid-gas interface comprises a level set equation, $\phi$.

The flow of fluid is described by the incompressible Navier-Stokes equations: $\nabla \cdot u = 0$; and $$\frac{\partial u}{\partial t} = -u \cdot \nabla u + \frac{f}{\rho} + \frac{v}{\rho} \nabla^2 u - \frac{\nabla p}{\rho},$$

where u denotes the velocity field of the fluid, p pressure, $\rho$ the density, $v$ the kinetic viscosity, and f represents the external forces per volume.

The liquid evolves dynamically in space and time according to the underlying fluid velocity field, u, wherein the level set function changes according to the dynamical evolution of liquid and is updated by the level set equation, $$\frac{\partial \phi}{\partial t} + u \cdot \nabla \phi = 0.$$

The method further comprises the step of solving the incompressible Navier-Stokes equations and the level set equation at each time step.

The step of solving the incompressible Navier-Stokes equations and the level set equation comprises steps of: advecting the level set according to the level set equation; updating the velocity by solving the Navier-Stokes equations; and simulating droplets and bubbles.

The level set function $\phi$ and the fluid velocity field u are updated.

The step of updating the velocity comprises steps of: calculating the advection component $u \cdot \nabla u$ using the semi-Lagrangian method; applying the forces $f/\rho$; adding the effect of the viscous term $v/\rho \nabla^2 u$ by employing implicit central differencing; and projecting the velocity field so that the condition $\nabla \cdot u = 0$ is met.

The step of calculating the advection component comprises steps of: applying an unsplit semi-Lagrangian constrained interpolation profile (USCIP) method of using the function values at the grid points and the spatial derivatives at those points for constructing the profile inside the grid cell; and solving the level set equation to advect the level set values, and With the CIP method, the profile corresponding to the interval $[x_i, x_{i+1}]$ in a three-dimensional case is represented by a polynomial, $$\Phi(x, y, z) = \sum_{0 \le i+j+k \le 3} C_{ijk} x^i y^j z^k + C_{310} x^3 y + C_{301} x z^3 +$$
$$C_{130} x y^3 + C_{031} y^3 z + C_{103} z^3 x + C_{013} z^3 y + C_{211} x^2 y x +$$
$$C_{121} x y^2 z + C_{112} x y z^2 + C_{311} x^3 y x + C_{131} x y^3 z + C_{113} x y z^3.$$

The coefficients may be uniquely given by, $$C_{000} = \phi_{000}, \ C_{100} = \phi_{x000}, \ C_{010} = \phi_{y000}, \ C_{001} = \phi_{z000}$$
$$C_{110} = \phi_{x010} - \phi_{x000} - (\Delta y_{10} - \Delta y_{00}) + (\phi_{y100} - \phi_{y000})$$
$$C_{011} = \phi_{y001} - \phi_{y000} - (\Delta z_{01} - \Delta z_{00}) + (\phi_{z010} - \phi_{z000})$$
$$C_{101} = \phi_{z100} - \phi_{z000} - (\Delta x_{01} - \Delta x_{00}) + (\phi_{x001} - \phi_{x000})$$
$$C_{200} = 3\Delta x_{00} - \phi_{x100} - 2\phi_{x000}$$
$$C_{020} = 3\Delta y_{00} - \phi_{y010} - 2\phi_{y000}$$
$$C_{002} = 3\Delta z_{00} - \phi_{z001} - 2\phi_{z000}$$
$$C_{111} = (\phi_{x011} - \phi_{x010} - \phi_{x001} + \phi_{x000}) + (\phi_{y101} - \phi_{y100} - \phi_{y001} + \phi_{y000}) +$$
$$(\phi_{z110} - \phi_{z100} - \phi_{z010} + \phi_{z000}) - 2(\phi_{111} - A)$$
$$C_{210} = 3(\Delta x_{10} - \Delta x_{00}) - 2(\phi_{x010} - \phi_{x000} - \phi_{x110} + \phi_{x100})$$
$$C_{201} = 3(\Delta x_{01} - \Delta x_{00}) - 2(\phi_{x001} - \phi_{x000} - \phi_{x101} + \phi_{x100})$$
$$C_{120} = 3(\Delta y_{10} - \Delta y_{00}) - 2(\phi_{y100} - \phi_{y000} - \phi_{y110} + \phi_{y010})$$
$$C_{021} = 3(\Delta y_{01} - \Delta y_{00}) - 2(\phi_{y001} - \phi_{y000} - \phi_{y011} + \phi_{y010})$$
$$C_{102} = 3(\Delta z_{10} - \Delta z_{00}) - 2(\phi_{z100} - \phi_{z000} - \phi_{z101} + \phi_{z001})$$
$$C_{012} = 3(\Delta z_{01} - \Delta z_{00}) - 2(\phi_{z010} - \phi_{z000} - \phi_{z011} + \phi_{z001})$$
$$C_{300} = \phi_{x100} + \phi_{x000} - 2\Delta x_{00}$$
$$C_{030} = \phi_{y010} + \phi_{y000} - 2\Delta y_{00}$$
$$C_{003} = \phi_{z001} + \phi_{z000} - 2\Delta z_{00}$$
$$C_{310} = \phi_{x110} - \phi_{x100} + \phi_{x010} - \phi_{x000} - 2(\Delta x_{10} - \Delta x_{00})$$
$$C_{301} = \phi_{x101} - \phi_{x100} + \phi_{x001} - \phi_{x000} - 2(\Delta x_{01} - \Delta x_{00})$$
$$C_{130} = \phi_{y110} - \phi_{y010} + \phi_{y100} - \phi_{y000} - 2(\Delta y_{10} - \Delta y_{00})$$
$$C_{031} = \phi_{y011} - \phi_{y010} + \phi_{y001} - \phi_{y000} - 2(\Delta y_{01} - \Delta y_{00})$$
$$C_{103} = \phi_{z101} - \phi_{z000} + \phi_{z100} - \phi_{z000} - 2(\Delta z_{10} - \Delta z_{00})$$
$$C_{013} = \phi_{z011} - \phi_{z000} + \phi_{z010} - \phi_{z000} - 2(\Delta z_{01} - \Delta z_{00})$$
$$C_{211} = 3(\phi_{111} - A) -$$
$$(\phi_{x111} - \phi_{x110} - \phi_{x101} + \phi_{x100}) - 2(\phi_{x011} - \phi_{x010} - \phi_{x001} + \phi_{x000})$$
$$C_{121} = 3(\phi_{111} - A) - (\phi_{y111} - \phi_{y110} - \phi_{y011} + \phi_{y010}) -$$
$$2(\phi_{y101} - \phi_{y100} - \phi_{y001} + \phi_{y000})$$
$$C_{112} = 3(\phi_{111} - A) - (\phi_{z111} - \phi_{z101} - \phi_{z011} + \phi_{z001}) -$$
$$2(\phi_{z110} - \phi_{z100} - \phi_{z010} + \phi_{z000})$$
$$C_{311} = (\phi_{x111} - \phi_{x110} - \phi_{x101} + \phi_{x100}) +$$
$$(\phi_{x011} - \phi_{x010} - \phi_{x001} + \phi_{x000}) - 2(\phi_{111} - A)$$
$$C_{131} = (\phi_{y111} - \phi_{y110} - \phi_{y011} + \phi_{y010}) +$$
$$(\phi_{y101} - \phi_{y100} - \phi_{y001} + \phi_{y000}) - 2(\phi_{111} - A)$$

-continued $$C_{113} = (\phi_{z111} - \phi_{z101} - \phi_{z011} + \phi_{z001}) +$$
$$(\phi_{z110} - \phi_{z100} - \phi_{z010} + \phi_{z000}) - 2(\phi_{111} - A)$$
$$A = \phi_{100} + \phi_{y100} + \phi_{z100} + C_{011} + C_{020} + C_{002} + C_{120} + C_{021} +$$
$$C_{102} + C_{012} + C_{030} + C_{003} + C_{130} + C_{031} + C_{103} + C_{013}.$$

where $\Delta xjk = \phi x1jk - \phi x0jk$, $\Delta yik = \phi yi1k - \phi i0k$, and $\Delta zij = \phi zij1 - \phi zij0$.

2. RELATED WORK

In the computer graphics field, fluid animation technique based on full 3D Navier-Stokes equations was first introduced by Foster and Metaxas [FM96]. Subsequently, Stam [Sta99] introduced an unconditionally stable fluid solver based on the semi-Lagrangian advection method.

The first-order semi-Lagrangian advection method uses linear interpolation, which is a source of numerical diffusion. Several high-order Eulerian advection schemes have been proposed to address this problem. Fedkiw et al. [FSJ01] introduced the use of monotonic cubic spline interpolation for the semi-Lagrangian process. Song et al. [SSK05] introduced the monotonic CIP method, and subsequently extended it to the octree data structure [SKK07]. Kim et al. [KLLR05, KLLR07] introduced the BFECC method, which has recently been analyzed by Selle et al. [SFK☐07].

To overcome the fundamental drawback associated with grid-based interpolation, several hybrid approaches have proposed that combine the Eulerian and Lagrangian frameworks. Improving the accuracy of surface tracking is another important issue in fluid simulation. To achieve accurate surface tracking in liquid animation, Enright et al. [EMF02] developed the particle level set method, and Mihalef et al. [MMS07] proposed the marker level set method. Velocity also suffers from numerical diffusion, and harms visual realism. For simulating fluids with swirls, Selle et al. [SRF05] embedded vortex particles to the fluid solver. Zhu and Bridson [ZB05] introduced the FLIP method to the graphics community, which performs the advection part in terms of massless particles. Song et al. [SKK07] developed the derivative particle method, which is a combination of the FLIP and CIP methods.

3. ORIGINAL CIP METHOD

The method developed in the present invention is devised so as to fix the problems associated with the original CIP and MCIP methods.

Hence, we describe the original CIP and MCIP in Sections 3 and 4, respectively, before presenting our new CIP method in Section 5

The original version of CIP was introduced in 1991 by Yabe and Aoki [YA91,YIW☐91]. The key idea of this method is to advect not only the physical quantities but also their derivatives. In general, the advection equation can be written as $$\frac{\partial \phi}{\partial t} + u\frac{\partial \phi}{\partial x} = 0, \quad (1)$$

where $\Phi$ is the physical quantity that is being advected. In 1D, differentiating equation (1) with respect to the spatial variable x gives $$\frac{\partial \phi x}{\partial t} + u\frac{\partial \phi x}{\partial x} = -u_x\frac{\partial \phi}{\partial x}, \quad (2)$$

which can be used to predict the evolution of $\Phi x$ over time. For solving equation (1), the CIP method uses the semi-Lagrangian method: for simplicity, we assume the grid size (xi+1−xi) is 1. If p is the back-tracked position, then its $\Phi$ value is approximated with the cubic-spline interpolation $$\Phi(p) = [(C_0 p + C_1)p + \phi_{x_i}]p + \phi_i, \quad (3)$$

where the coefficients C0 and C1 are given in terms of the $\Phi$ and $\Phi x$ values of grid points $$C_0 = \phi_{x_i} + \phi_{x_{i+1}} - 2(\phi_{i+1} - \phi_i) \quad (4)$$

$$C_1 = 3(\phi_{i+1} - \phi_i) - 2\phi_{x_i} - \phi_{x_{i+1}}. \quad (5)$$

Extending this method to two and three dimensions, however, turns out not to be straightforward. To extend CIP to higher dimensions, Yabe and Aoki introduced 2D and 3D polynomials [YIW☐91]. For 2D, they use the polynomial $$\Phi(x, y) = \sum_{0 \leq i+j \leq 3} C_{ij} x^i y^j. \quad (6)$$

Figure 3:
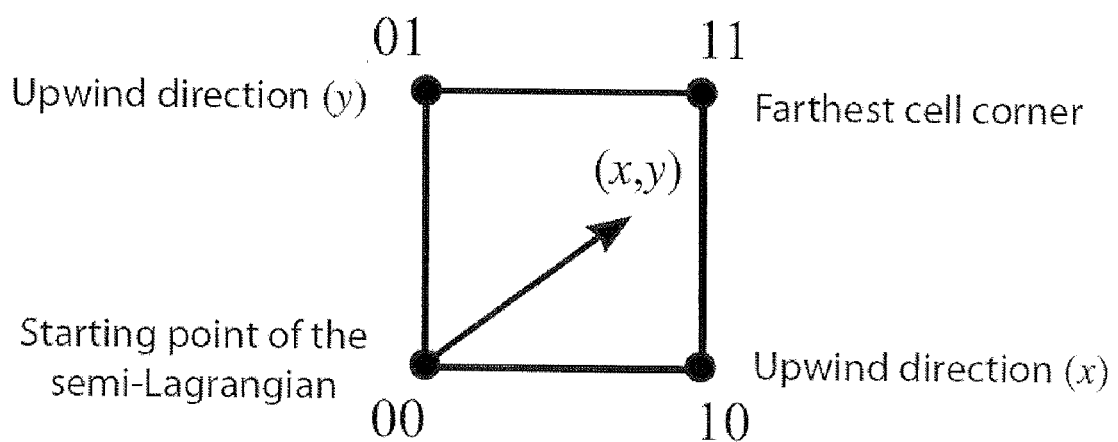
FIG. 3 is diagram illustrating indexing of 2D CIP interpolation according to an embodiment of the invention.

The ten coefficients of the above polynomial are determined from four known physical values and six derivative values at the cell corners. It is critical to note where they took the derivative values. They took x and y directional derivatives from only three cell corners, specifically the two upwind directions and the starting point of the semi-Lagrangian, as shown in FIG. 3. Since the construction of the above polynomial does not utilize the derivative information at the farthest cell corner, the method is accurate only when the back-tracked point falls near the starting point of the semi-Lagrangian advection. This can be problematic for simulations with large CFL numbers. Another critical problem of the original CIP methods is that they can generate instabilities. Even in the case of 1D CIP interpolation, stability is not guaranteed. The Hermite interpolating polynomial, which is defined with the values and their derivatives at the end points, can easily generate overshooting profiles.

4. MONOTONIC CIP METHOD

Song et al. [SSK05] proposed a variation of the original CIP method, namely the monotonic CIP (MCIP). To ensure stability, MCIP uses a modified version of the grid point derivatives if the profiles of equation (3) can potentially have overshoots. Song et al. derived the sufficient condition for the grid point derivatives that guarantees a monotonic profile. The MCIP method is unconditionally stable. However, the derivative clamping in MCIP can over-stabilize the situation; in cases where the original CIP does not generate instabilities, MCIP tends to give slightly more diffusive simulation results compared to the original CIP method.

Song et al. [SSK05] extended the 1D MCIP method to 2D and 3D. They obtained the higher dimensional MCIPs by cascading the 1D MCIP solver. This dimensional splitting is described in detail in [SSK05]. Since the 2D/3D MCIPs are composed of monotonic interpolations, they are also unconditionally stable. With the dissipation-suppressing nature inherited from the original CIP and the unconditional stability achieved by Song et al., MCIP could perform 2D simulations of water in real-time.

Although the dimensional splitting brought stability to the MCIP method, it has two major drawbacks. Firstly, the dimensional splitting of MCIP leads to a higher computational load compared to unsplit CIP. In 2D, six cubic-spline interpolations must be performed for a single semi-Lagrangian access [SSK05]: two along the x-axis for $\Phi$☐and Φx, two along the x-axis for Φy and Φxy, one along the y-axis for Φ and Φy, and one along the y-axis for Φx and Φxy. In 3D, 27 cubic-spline interpolations are required for a single access (since the second and third derivatives must be interpolated as well). Also, MCIP uses a large number of condition statements (if-else) to keep a monotonic profile. Song et al. [SKK07] have shown that, in the 3D octree data-structure, the computation time for MCIP is 60% higher than that of linear advection. Since most discussions in this paper are made in the context of semi-Lagrangian advection, we will refer to first-order semi-Lagrangian advection simply as linear advection.

The second drawback associated with the dimensional splitting of MCIP is numerical error. The results produced using the split-interpolation are not identical to those produced using the unsplit-interpolation; the results of the split interpolation depend on the axis direction. Moreover, Xiao et al. [XYNI96a] have shown that dimensional-splitting exhibits numerical diffusion when simulating shear motion. Also, we note that the split-CIP-interpolation requires second and third derivatives that must be calculated by central differencing. This represents another source of numerical diffusion, and calls for a non-negligible amount of extra computation. More importantly, the use of central differencing harms the compactness of the CIP method.

From the above, it is apparent that unsplit-CIP interpolation is more attractive than CIP interpolation with dimensional splitting. However, although unsplit-CIP interpolation has existed since the birth of the CIP method, a stable unsplit-CIP-interpolation that can be used for any (unrestricted) semi-Lagrangian advection has yet to be developed.

5. UNSPLIT SEMI-LAGRANGIAN CIP METHOD

The present invention develops an unsplit semi-Lagrangian CIP (USCIP) method, where the words 'semi-Lagrangian' in the name bears the stability. Our proposed technique should be applicable to simulations without any CFL restrictions. To develop USCIP, we go back to Yabe and Aoki's original 2D and 3D polynomials and make necessary modifications. A fundamental deviation we make from the original CIP is that we utilize all the derivative information for each cell. In 2D, a cell has 12 known values: Φ, Φx, and Φy at the four corners. Another deviation from the original CIP is that we include two additional terms, $x^3y$ and $xy^3$, in the polynomial; specifically, the 2D polynomial we use for USCIP is $$\Phi(x, y) = \sum_{0 \le i+j \le 3} C_{ij} x^i y^j + C_{31} x^3 y + C_{13} xy^3. \quad (7)$$

We included the two extra terms because of the mismatch between the number of known values (12) and the number of terms (10) in the third-order 2D polynomial. There are two options for overcoming this mismatch arising from the use of all the known values: to formulate the coefficient-finding task as an over-constrained problem and find the least-squares solution; or to insert extra terms to match the number of known values. We chose the latter option in the present invention. We did not follow the first option because when interpolation is performed with the least-squares solution, (1) the interpolated result at the corner will not be identical to the known value at that corner, and (2) it will not be C0 continuous across the cell boundaries.

The forms of the two added terms were decided according to the following three principles: 1) the new terms should not create any asymmetry, i.e., if $x'''y''$ is added, then $x''y'''$ must also be added; 2) the new terms should contain both x and y, since such terms can reflect off-axis motion such as rotation and shear better than decoupled terms; and 3) among the terms that satisfy the first and second principles, the lowest order terms should be chosen to prevent any unnecessary wiggles. The terms that pass all three criteria are $x^3y$ and $xy^3$.

The coefficients of the polynomial can be computed in a manner similar to that described by Yabe and Aoki [YIW 91]. Let Φ00, Φ10, Φ01, and Φ11 be the physical quantities at each cell corner. Let Φx=∂Φ/∂x, and Φy=∂Φ/∂y. Let Φx00, Φx10, Φx01, Φx11, Φy00, Φy10, Φy01, and Φy11 be the derivative values at each cell corner. Then, the coefficients C00, ..., C31 are uniquely given by, $$C_{00} = \phi_{00} \quad (8)$$
$$C_{10} = \phi_{x00}$$
$$C_{01} = \phi_{y00}$$
$$C_{20} = 3(\phi_{10} - \phi_{00}) - \phi_{x10} - 2\phi_{x00}$$
$$C_{02} = 3(\phi_{01} - \phi_{00}) - \phi_{y01} - 2\phi_{y00}$$
$$C_{30} = -2(\phi_{10} - \phi_{00}) + \phi_{x10} + \phi_{x00}$$
$$C_{03} = -2(\phi_{01} - \phi_{00}) + \phi_{y01} + \phi_{y00}$$
$$C_{21} = 3\phi_{11} - 2\phi_{x01} - \phi_{x11} - 3(C_{00} + C_{01} + C_{02} + C_{03}) - C_{20}$$
$$C_{31} = -2\phi_{11} + \phi_{x01} - \phi_{x11} - 2(C_{00} + C_{01} + C_{02} + C_{03}) - C_{30}$$
$$C_{12} = 3\phi_{11} - 2\phi_{y10} - \phi_{y11} - 3(C_{30} + C_{20} + C_{10} + C_{00}) - C_{02}$$
$$C_{13} = -2\phi_{11} + \phi_{y10} - \phi_{y11} - 2(C_{00} + C_{10} + C_{20} + C_{30}) - C_{03}$$
$$C_{11} = \phi_{x01} - C_{13} - C_{12} - C_{10}.$$

For the 3D case, the coefficients are presented in Appendix A.

The effect of utilizing the derivative information at the farthest cell corner (the back right corner in the figure) is shown in FIG. 4 of the paper. At every corner, Φy=0. At the back right corner, Φ=1, Φx=0, and at the back left corner, Φ=0, Φx=5, while Φ=Φx=0 at the remaining corners. We can see that the original CIP forms a steep slope around the farthest corner, whereas USCIP reflects all the derivative information in the profile.

Although utilization of the derivative information at the farthest cell corner helps improve the stability, it does not guarantee that the interpolated value will always be bounded by the grid point values. Thus, we need to make a provision to keep the USCIP stable. One option would be to follow the approach taken in MCIP; that is, we could find the sufficient condition for the derivatives which makes the profile monotonic for an arbitrary direction. However, we do not take this approach for the following reasons: (1) finding the sufficient condition becomes a 24-degree-of-freedom optimization problem in 3D since we have three derivatives for each of the eight cell corners, and (2) clamping the derivatives into the sufficient condition might lead to over-stabilization in some cases that are not overshoots.

In USCIP, we perform a very simple clamping: when the interpolated result is larger/smaller than the maximum/minimum of the cell node values, we replace the result with the maximum/minimum value. This delayed clamping procedure, which is similar to the one used in the unconditionally stable MacCormack scheme [SFK☐07], guarantees unconditional stability without introducing unnecessary over-stabilization.

USCIP works on compact stencils since it does not need to calculate high-order derivatives. This is an important improvement over MCIP. Obviating the calculation of high-order derivatives also reduces the computation time.

Although constructing and interpolating with a high-order unsplit polynomial is more complicated than working with 1D split polynomials, since the split-CIP involves multiple interpolations, overall USCIP requires fewer operations than MCIP. According to our implementation, MCIP performs 693 (21×27+126) operations for a 3D interpolation; that is, 27 1D interpolations must be performed for a 3D tri-cubic interpolation, and each 1D interpolation involves 21 operations. Additionally, MCIP must compute second and third derivatives, which involves 126 operations. By contrast, USCIP performs 296 operations for a 3D interpolation, which corresponds to only 43% of the total operation count needed for MCIP.

TABLE 1

Computation time for the smoke simulation shown in FIG. 1 of the paper

|  | Linear | BFECC | MCIP | USCIP |
|---|---|---|---|---|
| Computation Time for Advection Only (sec/frame) | 5.80 | 29.60 | 26.92 | 11.81 |
| Computation Time for Total Simulation (sec/frame) | 41.36 | 65.48 | 62.28 | 45.39 |

TABLE 2

Pseudo-code for the 2D USCIP fluid solver

```
advance_single_time_step ( ) {
    // Non-advection part for u(u, v) (see [Sta99] for the details).
    u* ⇐ add_force / diffuse / project ( uⁿ )
    // Compute RHS of the equation (2) for u(u, v).
    ∇u* ⇐ update_derivatives ( uⁿ, ∇uⁿ, u*, uⁿ )
    ∇v* ⇐ update_derivatives ( vⁿ, ∇vⁿ, v*, uⁿ )
    // Advection part for u(u, v).
    // Compute equation (1) and LHS of the equation (2).
    uⁿ⁺¹, ∇uⁿ⁺¹ ⇐ advect_velocity_USCIP ( u*, ∇u* )
}
// Update derivatives for f (see [YIW* 91] for more details).
update_derivatives ( fⁿ, ∇fⁿ, f*, uⁿ ) {
    for each cell {
```

$$f^*_{x_{i,j}} = f^n_{x_{i,j}} + \frac{1}{2\Delta x}(f^*_{i+1,j} - f^*_{i-1,j} - f^n_{i+1,j} + f^n_{i-1,j}) -$$

$$\frac{\Delta t}{\Delta x}\left[f^n_{x_{i,j}}(u^n_{i+1/2,j} - u^n_{i-1/2,j}) + f^n_{y_{i,j}}(v^n_{i+1/2,j} - v^n_{i-1/2,j})\right]$$

$$f^*_{y_{i,j}} = f^n_{y_{i,j}} + \frac{1}{2\Delta y}(f^*_{i,j+1} - f^*_{i,j-1} - f^n_{i,j+1} + f^n_{i,j-1}) -$$

$$\frac{\Delta t}{\Delta y}\left[f^n_{x_{i,j}}(u^n_{i,j+1/2} - u^n_{i,j-1/2}) + f^n_{y_{i,j}}(v^n_{i,j+1/2} - v^n_{i,j-1/2})\right]$$

```
    }
    return ∇f*
}
```

6. EXPERIMENTAL RESULTS

The simulations reported in this section were performed on a PowerMac G5 2.5 GHz with 5.5 GB of memory. For the simulations on Zalesak's disk and smoke, the linear, BFECC, and MCIP advections were also performed for comparison. BFECC and MCIP were implemented according to [KLL☐07] and [SSK05], respectively. In every simulation, a uniform grid was used, and the CFL number was restricted to two. No vortex reinforcement method such as that described in [FSJ01] or [SRF05] was used in any of the experiments. Rendering was performed using our in-house ray-tracer. The pseudo-code for our 2D fluid solver is described in Table 2. Although the pseudo-code does not include the density or level set implementation, it is straightforward to extend it to smoke or liquid simulator.

6.1. Rigid Body Rotation of Zalesak's Disk

We performed Zalesak's disk experiment [Zal79] on a 100×100 resolution grid. The contour of the disk was tracked via the level set field. This experiment is not designed to measure the interface tracking capability. (Interface tracking can be easily improved by applying hybrid techniques such as those in [ELF03], [SKK07] or [MMS07].) Rather, the experiment focuses on measuring the anti-dissipation capabilities of purely Eulerian advection methods. For the same reason, we did not perform reinitialization of the level set, as in [SFK☐07].

We rotated the disk using four advection schemes: linear (first-order semi-Lagrangian), BFECC, MCIP, and USCIP. The results, shown in FIG. 2 of the paper, indicate that USCIP produces the most accurate result and that, as explained in Sections 4 and 5, USCIP produces a less diffusive result than MCIP.

6.2. Smoke Injected Toward a Statue

In this experiment, smoke is injected toward a statue and vortices are generated behind the statue. As in the previous experiment, we ran the simulation with four advection schemes and measured the computation times. The grid resolution was 135×90×90. FIG. 1 of the paper shows snapshots taken at the same simulation time in the computations using the four advection schemes. Table 1 summarizes the average computation time for simulating a single frame (not for simulating a single time step). The figure and table show that, among the three high-order schemes, USCIP runs more than twice as fast as BFECC and MCIP but produces a result that is clearly less diffusive. We note that USCIP ran faster than BFECC. In fact, USCIP involves more operations than BFECC in a single loop, but BFECC performs more loops than USCIP. Thus USCIP takes advantage of the cache hit. Also, BFECC has to perform an artificially designed diffusion process for suppressing noise [KLL☐07], which adds more operations. Since USCIP has to store spatial derivatives, it uses three times more memory for each advection. This is not a problem, however, given that it is now possible to mount gigabytes of memories in PCs. Even with uniform grids, USCIP could simulate a fairly complex fluid scene on a single PC.

6.3. Rising Smoke Passing Through Obstacles

Initially the smoke forms the letters of the word 'SMOKE' in 3D. As the smoke rises due to the buoyancy force, it hits obstacles, leading to the generation of many complex swirls inside the domain. The smoke was simulated with USCIP on an 160×220×80 grid. A series of snapshots is shown in FIG. 5 of the paper. This experiment demonstrates that USCIP can generate realistic swirling of smoke under complicated internal boundary conditions without the assistance of vortex reinforcement methods.

6.4. Dropping a Bunny-Shaped Water onto Still Water

This experiment and the next one simulate the motion of water, and show that USCIP can be used in hybrid methods. In these two experiments, we employed the particle level set method [EMF02] for tracking the water surfaces. In the current experiment, a bunny-shaped water chunk was dropped onto still water. The grid resolution was 150³. FIG. 6 of the paper shows a series of snapshots as the bunny strikes the water surface. USCIP successfully generated complicated small-scale features such as droplets, thin water sheets, and small waves.

6.5. Colliding Water after Dam Breaking

We next used USCIP to simulate a mid-scale dam breaking. The grid resolution was 200×150×100. Two columns of water, each with dimensions 0.6 m×0.8 m×0.6 m, were released to make a violent collision. In this situation, advection is the dominant part in the fluid simulation. As shown in FIG. 7 of the paper, after the collision of two columns of water, thin and tall water sheets were developing and then lost their momentum near the ceiling. After that, the sheets were falling in shapes of many tiny droplets due to the gravity. This experiment indicates that USCIP can reproduce the detailed movements of fast fluids.

6.6. Vorticity Preservation Test

Although our method is purely Eulerian, we compared USCIP with FLIP [ZB05], which is a particle-grid hybrid method. We initially set the velocities of a 1 m×1 m domain to the single vortex field which is defined by the stream function $$\psi = \frac{1}{\pi}\sin^2(\pi x)\sin^2(\pi y). \quad (9)$$

For FLIP, we seeded nine particles for each cell of 100×100 grids. We used Zhu and Bridson's 2D FLIP solver[1] for the FLIP simulation. As shown in FIG. 8 of the paper, the result generated with FLIP shows noisy curl field. Such a problem is not visible in the result generated with USCIP.

7. CONCLUSION

In the present invention, a new semi-Lagrangian CIP method which is stable, fast, and produces accurate results is provided. By noting the problems associated with the original CIP and MCIP methods, we concluded that a new polynomial containing two additional fourth-order terms could be used for the third-order interpolation. By judiciously choosing the newly introduced terms, the proposed advection technique could reflect all the derivative information stored at the grid points without producing any noticeable artifacts. The proposed technique ran more than twice as fast as BFECC or MCIP but produced results that were clearly less diffusive. Since USCIP works at a fundamental level, it can be applied to existing advanced fluid simulators to enhance their speed, stability, and accuracy.

While the invention has been shown and described with reference to different embodiments thereof, it will be appreciated by those skilled in the art that variations in form, detail, compositions and operation may be made without departing from the spirit and scope of the invention as defined by the accompanying claims.

REFERENCES

[ELF03] ENRIGHT D., LOSSASO F., FEDKIW R.: A fast and accurate semi-lagrangian particle level set method. *Computers and Structures* 83 (2003), 479-490. 6

[EMF02] ENRIGHT D., MARSCHNER S., FEDKIW R.: Animation and rendering of complex water surfaces. *ACM Trans. Graph.* 21, 3 (2002), 736-744. 1, 2, 6

[FM96] FOSTER N., METAXAS D.: Realistic animation of liquids. *Graphical models and image processing: GMIP* 58, 5 (1996), 471-483. 2

[FSJ01] FEDKIW R., STAM J., JENSEN H. W.: Visual simulation of smoke. *Computer Graphics (Proc. ACM SIGGRAPH 2001)* 35 (2001), 15-22. 1, 2, 5

[KLL*07] KIM B., LIU Y., LLAMAS I., JIAO X., ROSSIGNAC J.: Simulation of bubbles in foam with the volume control method. *ACM Trans. Graph.* 26, 3 (2007), 98. 2, 5, 6

[KLLR05] KIM B., LIU Y., LLAMAS I., ROSSIGNAC J.: Flowfixer: Using bfecc for fluid simulation. In *Eurographics Workshop on Natural Phenomena* 2005 (2005). 1, 2

[KLLR07] KIM B., LIU Y., LLAMAS I., ROSSIGNAC J.: Advections with significantly reduced dissipation and diffusion. *IEEE Transactions on Visualization and Computer Graphics* 13, 1 (2007). 1, 2

[MMS07] MIHALEF V., METAXAS D., SUSSMAN M.: Textured liquids based on the marker level set. In *Eurographics 2007 proceedings* (2007), pp. 457-466. 2, 6

[OF02] OSHER S., FEDKIW R.: *The Level Set Method and Dynamic Implicit Surfaces*. Springer-Verlag, New York, 2002. 1

[SFK*07] SELLE A., FEDKIW R., KIM B., LIU Y., ROSSIGNAC J.: An unconditionally stable maccormack method. *J. Sci. Comput. in review* (2007). 2, 5, 6

[SKK07] SONG O.-Y., KIM D., KO H.-S.: Derivative particles for simulating detailed movements of fluids. *IEEE Transactions on Visualization and Computer Graphics* 13, 4 (2007), 711-719. 1, 2, 3, 6

[SRF05] SELLE A., RASMUSSEN N., FEDKIW R.: A vortex particle method for smoke, water and explosions. *ACM Trans. Graph.* 24, 3 (2005). 1, 2, 5

[SSK05] SONG O.-Y., SHIN H., KO H.-S.: Stable but non-dissipative water. *ACM Trans. Graph.* 24, 1 (2005), 81-97. 1, 2, 3, 5

[Sta99] STAM J.: Stable fluids. *Computer Graphics (Proc. ACM SIGGRAPH '99)* 33, Annual Conference Series (1999), 121-128. 2, 7

[TFK*03] TAKAHASHI T., FUJII H., KUNIMATSU A., HIWADA K., SAITO T., TANAKA K., UEKI H.: Realistic animation of fluid with splash and foam. In *Eurographics 2003 proceedings* (2003), pp. 391-400. 1

[XYNI96a] XIAO F., YABE T., NIZAM G., ITO T.: Constructing a multi-dimensional oscillation preventing scheme for the advection equation by a rational function. *Computer Physics Communications* 94, 2-3 (1996), 103-118. 2, 4

[XYNI96b] XIAO F., YABE T., NIZAM G., ITO T.: Constructing oscillation preventing scheme for the advection equation by a rational function. *Computer Physics Communications* 93, 1 (1996), 1-12. 2

[YA91] YABE T., AOKI T.: A universal solver for hyperbolic equations by cubic-polynomial interpolation i. one dimensional solver. *Computer Physics Communications* 66, 2-3 (1991), 219-232. 2

[YIW*91] YABE T., ISHIKAWA T., WANG P. Y., AOKI T., KADOTA Y., IKEDA F.: A universal solver for hyperbolic equations by cubic-polynomial interpolation ii. Two and three-dimensional solvers. *Computer Physics Communications* 66, 2-3 (1991), 233-242. 2, 3, 4, 7

[Zal79] ZALESAK S. T.: Fully multidimensional flux corrected transport algorithms for fluids. *J. Comp. Phys.* 31, 3 (1979), 335-362. 6

[ZB05] ZHU Y., BRIDSON R.: Animating sand as a fluid. *ACM Trans. Graph.* 24, 3 (2005), 965-972. 2, 7

What is claimed is:

1. A method for simulating fluid using semi-Lagrangian CIP fluid solver without dimensional splitting, the method comprising steps for:
   modeling multiphase materials with grid of nodes for dealing with the multiphase behaviors including the dynamics of the borders between liquids and gas;
   suppressing numerical dissipation for getting rid of loss of mass of material of one phase from numerical dissipations due to the coarseness of the modeling of the materials in terms of grid of nodes; and
   suppressing numerical diffusion for reducing dampening of the fluid motion of materials in liquid phase,
   wherein the step of modeling multiphase materials comprises steps of:
      describing liquid and gas with a set of nonlinear partial differential equations that describe the flow of the fluids;
      representing the liquid-gas interface as an implicit surface; and
      determining properties of the materials, from the information about the liquid-gas interface, including the surface curvature and the surface tension,
   wherein the set of nonlinear partial differential equations comprises multiphase incompressible Navier-Stokes equations, wherein the step of representing the liquid-gas interface comprises a level set equation, $\phi$,
   wherein the flow of fluid is described by the incompressible Navier-Stokes equations:

$$\nabla \cdot u = 0; \text{ and } \frac{\partial u}{\partial t} = -u \cdot \nabla u + \frac{f}{\rho} + \frac{v}{\rho}\nabla^2 u - \frac{\nabla p}{\rho},$$

wherein u denotes the velocity field of the fluid, p pressure, $\rho$ the density, $v$ the kinetic viscosity, and f represents the external forces per volume,
   wherein the liquid evolves dynamically in space and time according to the underlying fluid velocity field, u, wherein the level set function changes according to the dynamical evolution of liquid and is updated by the level set equation, $$\frac{\partial \phi}{\partial t} + u \cdot \nabla \phi = 0,$$

further comprising the step of solving the incompressible Navier-Stokes equations and the level set equation at each time step,
   wherein the step of solving the incompressible Navier-Stokes equations and the level set equation comprises steps of:
      advecting the level set according to the level set equation;
      updating the velocity by solving the Navier-Stokes equations; and
      simulating droplets and bubbles,
   wherein the level set function $\phi$ and the fluid velocity field u are updated,
   wherein the step of updating the velocity comprises steps of:
      calculating the advection component $u \cdot \nabla u$ using the semi-Lagrangian method;
      applying the forces $f/\rho$;
      adding the effect of the viscous term $v/\rho \nabla^2 u$ by employing implicit central differencing; and
      projecting the velocity field so that the condition $\nabla \cdot u = 0$ is met,
   wherein the step of calculating the advection component comprises steps of:
      applying an unsplit semi-Lagrangian constrained interpolation profile (USCIP) method of using the function values at the grid points and the spatial derivatives at those points for constructing the profile inside the grid cell; and
      solving the level set equation to advect the level set values, and
   wherein, with the CIP method, the profile corresponding to the interval $[x_i, x_{i+1}]$ in a two-dimensional case is represented by a polynomial, $$\Phi(x, y) = \sum_{0 \leq i+j \leq 3} C_{ij} x^i y^j + C_{31} x^3 y + C_{13} xy^3. \quad (7),$$

where C00, . . . , C31 are coefficients of the polynomial.

2. The method of claim 1, wherein the coefficients are uniquely given by, $$C_{00} = \phi_{00} \quad (8)$$
$$C_{10} = \phi_{x00}$$
$$C_{01} = \phi_{y00}$$
$$C_{20} = 3(\phi_{10} - \phi_{00}) - \phi_{x10} - 2\phi_{x00}$$
$$C_{02} = 3(\phi_{01} - \phi_{00}) - \phi_{y01} - 2\phi_{y00}$$
$$C_{30} = -2(\phi_{10} - \phi_{00}) + \phi_{x10} + \phi_{x00}$$
$$C_{03} = -2(\phi_{01} - \phi_{00}) + \phi_{y01} + \phi_{y00}$$
$$C_{21} = 3\phi_{11} - 2\phi_{x01} - \phi_{x11} - 3(C_{00} + C_{01} + C_{02} + C_{03}) - C_{20}$$
$$C_{31} = -2\phi_{11} + \phi_{x01} - \phi_{x11} - 2(C_{00} + C_{01} + C_{02} + C_{03}) - C_{30}$$
$$C_{12} = 3\phi_{11} - 2\phi_{y10} - \phi_{y11} - 3(C_{30} + C_{20} + C_{10} + C_{00}) - C_{02}$$
$$C_{13} = -2\phi_{11} + \phi_{y10} - \phi_{y11} - 2(C_{00} + C_{10} + C_{20} + C_{30}) - C_{03}$$
$$C_{11} = \phi_{x01} - C_{13} - C_{12} - C_{10}.$$

Where $\Phi_{00}$, $\Phi_{10}$, $\Phi_{01}$, and $\Phi_{11}$ are physical quantities at each cell corner, $\Phi_x = \partial \Phi / \partial x$, $\Phi_y = \partial \Phi / \partial y$, and $\Phi_{x00}$, $\Phi_{x10}$, $\Phi_{x01}$, $\Phi_{x11}$, $\Phi_{y00}$, $\Phi_{y10}$, $\Phi_{y01}$, and $\Phi_{y11}$ are the derivative values at each cell corner.

3. The method of claim 2, wherein the step of representing the liquid-gas interface comprises a level set method.

4. The method of claim 3, wherein the level set method comprises a level set equation, $\phi$, an implicit signed distance function defined to be positive for liquid and negative for gas, wherein the sign of $\phi$ determines the density and viscosity of the medium.

5. The method of claim 4, wherein the surface of liquid is obtained by tracking the locations for $\phi = 0$.

6. The method of claim 1, wherein the step of advecting the level set comprises a step of updating the density and viscosity fields appearing in the Navier-Stokes equation.

7. The method of claim 1, wherein the semi-Lagrangian method comprises a step of calculating a function value by referring to the advection at $x - u\Delta t$, wherein the function value is obtained by linearly interpolating the function values at the neighboring grid points.

8. The method of claim 1, wherein the step of solving the level set equation comprises steps of:
  differentiating the level set equation to get $$\frac{\partial \phi_\xi}{\partial t} + u \cdot \nabla \phi_\xi = -u_\xi \cdot \nabla \phi,$$

wherein $\phi_\xi = \partial \phi / \partial \xi$, $u_\xi = \partial u / \partial \xi$, and $\xi$ is one of the spatial variables x, y, and z;
  solving the non-advective part $\partial \phi_\xi / \partial t = -u_\xi \cdot \nabla \phi$ using finite differencing; and
  advecting the result according to $$\frac{\partial \phi_\xi}{\partial t} + u \cdot \nabla \phi_\xi = 0,$$

wherein the advected results $\phi_j$ and $\phi'_j$ for a grid point $x_j$ backtraced to $x_r \in [x_i, x_{i+1}]$ are obtained as $\phi_j = \Phi(X_r)$ and $\phi'_j = \Phi'(X_r)$ wherein $X_r = x_r - x_i$.

9. The method of claim 8, wherein the step of calculating the profile $\Phi$ comprises a step of applying a monotonic CIP method to the grid points in which oscillations are present, that is the value $\Phi(X_r)$ lies outside the range $[\phi_i, \phi_{i+1}]$.

10. The method of claim 9, wherein the monotonic CIP method comprises a step of modifying the derivatives $\phi'_i$ and $\phi'_{i+1}$ by using a polynomial function giving a monotonic profile instead of a rational function.

11. The method of claim 1, wherein the CIP method comprises a step of approximating the second order and higher derivatives by finite differencing of the first order derivatives in a three-dimensional calculation.

12. The method of claim 1, wherein the force comprises gravity and surface tension, wherein the gravity is $\rho g$, where g is the gravitational acceleration, wherein the surface tension is given by $f_{st} = -\rho \sigma \kappa(\phi) \delta_\epsilon(\phi) \nabla \phi$, where $\sigma$ is a constant coefficient, $\kappa$ is the local curvature, and $\delta_\epsilon$ is a smeared delta function, $$\delta_\epsilon(\phi) = \frac{1}{2\epsilon} + \frac{1}{2\epsilon} \cos\left(\frac{\pi \phi}{\epsilon}\right): \ |\phi| \le \epsilon,$$
$$= 0: \quad \text{otherwise,}$$

where $\epsilon$ is a smearing width.

13. The method of claim 1, wherein the step of simulating droplets and bubbles comprises steps of:
  locating the droplets or bubbles;
  simulating the region with Lagrangian motion based on particle dynamics;
  reducing the level set values of the region to values that are small for the droplets and negating the original level set values for the bubbles such that the region will not be mistakenly processed by the level set method; and
  restituting the droplets or bubbles into the grid-based fluid model.

14. The method of claim 13, wherein the droplets or bubbles in the step of simulating the region with Lagrangian motion experiences gravitational, drag forces, and pressure from the surrounding fluid, $$f = m_f g + \alpha_d r^2 (\bar{u} - \dot{x}) \|\bar{u} - \dot{x}\| - V_f \nabla p,$$

where $m_f$ is the mass, $V_f$ is the volume, $\alpha_d$ is the drag coefficient, r is the radius, $\dot{x}$ is the current velocity of the droplet or bubble, and $\bar{u}$ is the interpolated velocity of the grid-based fluid measured at the center of the droplet or bubble.

15. The method of claim 13, wherein the step of restituting the droplets or bubbles comprises steps of:
  locating the droplets or bubbles in which the volume of the droplet or bubble is larger than at least two times the cell size; and
  removing the droplet or bubble, updating the level set values by $\phi(x_i) = s_p(r_p - |x_i - x_p|)$, and setting the grid point velocities to the velocity of the droplet or bubble, wherein $s_p = +1$ for the case of liquid droplet and $-1$ for the case of gas bubble, $r_p$ is the radius of the droplet or bubble, $x_p$ is the center of the droplet or bubble, and $x_i$ is the grid point being updated.

16. The method of claim 15, wherein the step of restituting the droplets or bubbles comprises steps of:
  locating the droplet or bubble which hits the surface or moves into the same phase fluid;
  updating the cell velocity by taking the average of the previous cell velocity and the velocity of droplet or bubble; and
  determining the new level set values for the cells covering the droplet or bubble using the volume of the droplets or bubbles.

17. The method of claim 1, further comprising steps of:
  a) generating multiple droplets or bubbles of smaller size to produce splashes and bubbles of smaller scales;
  b) modeling the geometrical shape of the droplet or bubble as an ellipsoid, wherein the eccentricity of the ellipsoid depends on the velocity of the droplet or bubble; and
  c) assigning to the surfacing bubbles a life time that is inversely proportional to the bubble size.

18. A method for simulating fluid using semi-Lagrangian CIP fluid solver without dimensional splitting, the method comprising steps for:
  modeling multiphase materials with grid of nodes for dealing with the multiphase behaviors including the dynamics of the borders between liquids and gas;
  suppressing numerical dissipation for getting rid of loss of mass of material of one phase from numerical dissipations due to the coarseness of the modeling of the materials in terms of grid of nodes; and
  suppressing numerical diffusion for reducing dampening of the fluid motion of materials in liquid phase,
  wherein the step of modeling multiphase materials comprises steps of
    describing liquid and gas with a set of nonlinear partial differential equations that describe the flow of the fluids;
    representing the liquid-gas interface as an implicit surface; and
    determining properties of the materials, from the information about the liquid-gas interface, including the surface curvature and the surface tension,
  wherein the set of nonlinear partial differential equations comprises multiphase incompressible Navier-Stokes equations, wherein the step of representing the liquid-gas interface comprises a level set equation, $\phi$,
  wherein the flow of fluid is described by the incompressible Navier-Stokes equations:

$$\nabla \cdot u = 0; \text{ and}$$

$$\frac{\partial u}{\partial t} = -u \cdot \nabla u + \frac{f}{\rho} + \frac{\nu}{\rho} \nabla^2 u - \frac{\nabla p}{\rho},$$

wherein u denotes the velocity field of the fluid, p pressure, $\rho$ the density, $\nu$ the kinetic viscosity, and f represents the external forces per volume, wherein the liquid evolves dynamically in space and time according to the underlying fluid velocity field, u, wherein the level set function changes according to the dynamical evolution of liquid and is updated by the level set equation, $$\frac{\partial \phi}{\partial t} + u \cdot \nabla \phi = 0,$$

further comprising the step of solving the incompressible Navier-Stokes equations and the level set equation at each time step,
wherein the step of solving the incompressible Navier-Stokes equations and the level set equation comprises steps of:
  advecting the level set according to the level set equation;
  updating the velocity by solving the Navier-Stokes equations; and
  simulating droplets and bubbles,
wherein the level set function φ and the fluid velocity field u are updated,
wherein the step of updating the velocity comprises steps of:
  calculating the advection component u·∇u using the semi-Lagrangian method;
  applying the forces f/ρ;
  adding the effect of the viscous term ν/ρ∇²u by employing implicit central differencing; and
  projecting the velocity field so that the condition ∇·u=0 is met,
wherein the step of calculating the advection component comprises steps of:
  applying an unsplit semi-Lagrangian constrained interpolation profile (USCIP) method of using the function values at the grid points and the spatial derivatives at those points for constructing the profile inside the grid cell; and
  solving the level set equation to advect the level set values, and
wherein, with the CIP method, the profile corresponding to the interval $[x_i, x_{i+1}]$ in a three-dimensional case is represented by a polynomial, $$\Phi(x,y,z) = \sum_{0 \le i+j+k \le 3} C_{ijk} x^i y^j z^k + C_{310} x^3 y + C_{301} xz^3 +$$
$$C_{130} xy^3 + C_{031} y^3 z + C_{103} z^3 x + C_{013} z^3 y + C_{211} x^2 yx +$$
$$C_{121} xy^2 z + C_{112} xyz^2 + C_{311} x^3 yx + C_{131} xy^3 z + C_{113} xyz^3.$$

19. The method of claim 18, wherein the coefficients are uniquely given by, $$C_{000} = \phi_{000}, \ C_{100} = \phi_{x000}, \ C_{010} = \phi_{y000}, \ C_{001} = \phi_{z000}$$

$$C_{110} = \phi_{x010} - \phi_{x000} - (\Delta y_{10} - \Delta y_{00}) + (\phi_{y100} - \phi_{y000})$$

-continued $$C_{011} = \phi_{y001} - \phi_{y000} - (\Delta z_{01} - \Delta z_{00}) + (\phi_{z010} - \phi_{z000})$$

$$C_{101} = \phi_{z100} - \phi_{z000} - (\Delta x_{01} - \Delta x_{00}) + (\phi_{x001} - \phi_{x000})$$

$$C_{200} = 3\Delta x_{00} - \phi_{x100} - 2\phi_{x000}$$

$$C_{020} = 3\Delta y_{00} - \phi_{y010} - 2\phi_{y000}$$

$$C_{002} = 3\Delta z_{00} - \phi_{z001} - 2\phi_{z000}$$

$$C_{111} = (\phi_{x011} - \phi_{x010} - \phi_{x001} + \phi_{x000}) + (\phi_{y101} - \phi_{y100} - \phi_{y001} + \phi_{y000}) +$$
$$(\phi_{z110} - \phi_{z100} - \phi_{z010} + \phi_{z000}) - 2(\phi_{111} - A)$$

$$C_{210} = 3(\Delta x_{10} - \Delta x_{00}) - 2(\phi_{x010} - \phi_{x000} - \phi_{x110} + \phi_{x100})$$

$$C_{201} = 3(\Delta x_{01} - \Delta x_{00}) - 2(\phi_{x001} - \phi_{x000} - \phi_{x101} + \phi_{x100})$$

$$C_{120} = 3(\Delta y_{10} - \Delta y_{00}) - 2(\phi_{y100} - \phi_{y000} - \phi_{y110} + \phi_{y010})$$

$$C_{021} = 3(\Delta y_{01} - \Delta y_{00}) - 2(\phi_{y001} - \phi_{y000} - \phi_{y011} + \phi_{y010})$$

$$C_{102} = 3(\Delta z_{10} - \Delta z_{00}) - 2(\phi_{z100} - \phi_{z000} - \phi_{z101} + \phi_{z001})$$

$$C_{012} = 3(\Delta z_{01} - \Delta z_{00}) - 2(\phi_{z010} - \phi_{z00} - \phi_{z011} + \phi_{z001})$$

$$C_{300} = \phi_{x100} + \phi_{x000} - 2\Delta x_{00}$$

$$C_{030} = \phi_{y010} + \phi_{y000} - 2\Delta y_{00}$$

$$C_{003} = \phi_{z001} + \phi_{z000} - 2\Delta z_{00}$$

$$C_{310} = \phi_{x110} - \phi_{x100} + \phi_{x010} - \phi_{x000} - 2(\Delta x_{10} - \Delta x_{00})$$

$$C_{301} = \phi_{x101} - \phi_{x100} + \phi_{x001} - \phi_{x000} - 2(\Delta x_{01} - \Delta x_{00})$$

$$C_{130} = \phi_{y110} - \phi_{y010} + \phi_{y100} - \phi_{y000} - 2(\Delta y_{10} - \Delta y_{00})$$

$$C_{031} = \phi_{y011} - \phi_{y010} + \phi_{y001} - \phi_{y000} - 2(\Delta y_{01} - \Delta y_{00})$$

$$C_{103} = \phi_{z101} - \phi_{z000} + \phi_{z100} - \phi_{z000} - 2(\Delta z_{10} - \Delta z_{00})$$

$$C_{013} = \phi_{z011} - \phi_{z000} + \phi_{z010} - \phi_{z000} - 2(\Delta z_{01} - \Delta z_{00})$$

$$C_{211} = 3(\phi_{111} - A) -$$
$$(\phi_{x111} - \phi_{x110} - \phi_{x101} + \phi_{x100}) - 2(\phi_{x011} - \phi_{x010} - \phi_{x001} + \phi_{x000})$$

$$C_{121} = 3(\phi_{111} - A) - (\phi_{y111} - \phi_{y110} - \phi_{y011} + \phi_{y010}) -$$
$$2(\phi_{y101} - \phi_{y100} - \phi_{y001} + \phi_{y000})$$

$$C_{112} = 3(\phi_{111} - A) - (\phi_{z111} - \phi_{z101} - \phi_{z011} + \phi_{z001}) -$$
$$2(\phi_{z110} - \phi_{z100} - \phi_{z010} + \phi_{z000})$$

$$C_{311} = (\phi_{x111} - \phi_{x110} - \phi_{x101} + \phi_{x100}) +$$
$$(\phi_{x011} - \phi_{x010} - \phi_{x001} + \phi_{x000}) - 2(\phi_{111} - A)$$

$$C_{131} = (\phi_{y111} - \phi_{y110} - \phi_{y011} + \phi_{y010}) +$$
$$(\phi_{y101} - \phi_{y100} - \phi_{y001} + \phi_{y000}) - 2(\phi_{111} - A)$$

$$C_{113} = (\phi_{z111} - \phi_{z101} - \phi_{z011} - \phi_{z001}) +$$
$$(\phi_{z110} - \phi_{z100} - \phi_{z010} + \phi_{z000}) - 2(\phi_{111} - A)$$

$$A = \phi_{100} + \phi_{z100} + \phi_{z100} + C_{011} + C_{020} + C_{002} + C_{120} + C_{021} +$$
$$C_{102} + C_{012} + C_{030} + C_{003} + C_{003} + C_{130} - C_{031} + C_{103} + C_{013}$$

where $\Delta x_{jk} = \phi_{x1jk} - \phi_{x0jk}$, $\Delta y_{ik} = \phi_{yi1k} - \phi_{i0k}$, and $\Delta z_{ij} = \phi_{zij1} - \phi_{zij0}$.

* * * * *